(12) United States Patent
Chang et al.

(10) Patent No.: US 8,396,833 B2
(45) Date of Patent: Mar. 12, 2013

(54) INODE MANAGEMENT IN REDIRECT-ON-WRITE FILE SYSTEM

(75) Inventors: Joon Chang, Austin, TX (US); David J. Craft, Wimberly, TX (US); Gokul B. Kandiraju, Tarrytown, NY (US); Manoj N. Kumar, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 80 days.

(21) Appl. No.: 12/879,855

(22) Filed: Sep. 10, 2010

(65) Prior Publication Data

US 2012/0066182 A1    Mar. 15, 2012

(51) Int. Cl.
*G06F 7/00* (2006.01)
*G06F 17/00* (2006.01)

(52) U.S. Cl. .................. 707/639; 707/682; 711/162
(58) Field of Classification Search .............. 707/639, 707/640, 649, 655, 657, 682, 703; 711/161, 711/162
See application file for complete search history.

(56) References Cited

U.S. PATENT DOCUMENTS

| | | | | |
|---|---|---|---|---|
| 7,856,423 | B1 * | 12/2010 | Revsin ........................ | 707/640 |
| 7,953,819 | B2 * | 5/2011 | Liang et al. ................. | 709/219 |
| 2005/0071388 | A1 * | 3/2005 | Fienblit et al. .............. | 707/204 |
| 2008/0034176 | A1 * | 2/2008 | Akutsu et al. ............... | 711/162 |

OTHER PUBLICATIONS

Jan Stender., Efficient Management of Consistent Backups in a Distributed File System, .2009, IEEE, 656-659.*
Helary et al., Communication-Induced Determination of Consistent Snapshots, 1999, vol. 10, IEEE, 865-877.*
Garimella, Neeta , "Understanding and exploiting snapshot technology for data protection, Part 1: Snapshot technology overview", *TSM Client Developer, Tivoli—Software Group,* IBM http://www.ibm.com/developerworks/tivoli/library/t-snaptsm1.html Obtained from internet on Sep. 6, 2010. Apr. 26, 2006, 9 pages.
Shah, Bhavana , "Disk Performance of Copy-On-Write Snapshot Logical Volumes", B.E., Indian Institute of Technology Roorkee, India , 1999 The University of British Columbia Aug. 2006 http://www.cs.ubc.ca/grads/resources/thesis/Nov06/Bhavana.pdf Obtained from Internet on Sep. 6, 2010. Aug. 2006, 83 pages.

* cited by examiner

*Primary Examiner* — Jean B Fleurantin
(74) *Attorney, Agent, or Firm* — DeLizio Gilliam, PLLC

(57) ABSTRACT

Some embodiments of the inventive subject matter allow a redirect-on-write file system to continue processing file transactions while writing a snapshot to persistent storage. Thus, embodiments do not block file transactions while flushing snapshots to persistent storage. To avoid blocking, some embodiments the file system can maintain two snapshot generations. The first snapshot generation is the snapshot being written to persistent storage. The second snapshot generation may reside in main memory, and store data for file transactions occurring after the file system began writing the first snapshot generation.

18 Claims, 4 Drawing Sheets

INODE MANAGEMENT IN REDIRECT-ON-WRITE FILE SYSTEM

Embodiments of the inventive subject matter generally relate to the field of operating systems, and more particularly to handling file operations in operating systems.

BACKGROUND

Operating systems are a basic component in most computer systems. Operating systems include file systems, which organize and store data within main memory and on disk (or other persistent storage). Some file systems can temporarily store the results of file operations in main memory before recording the results to persistent storage. In some file systems, recording file operations to persistent storage can cause file the file system to stall (i.e., temporarily stop processing new file operations) until the recording completes.

SUMMARY

Some embodiments of the inventive subject matter allow a redirect-on-write file system to continue processing file transactions while writing a snapshot to persistent storage. Thus, embodiments do not block file transactions while flushing snapshots to persistent storage. To avoid blocking, in some embodiments, the file system can maintain two snapshot generations. The first snapshot generation is the snapshot being written to persistent storage. The second snapshot generation may reside in main memory, and store data for file transactions occurring after the file system began writing the first snapshot generation.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
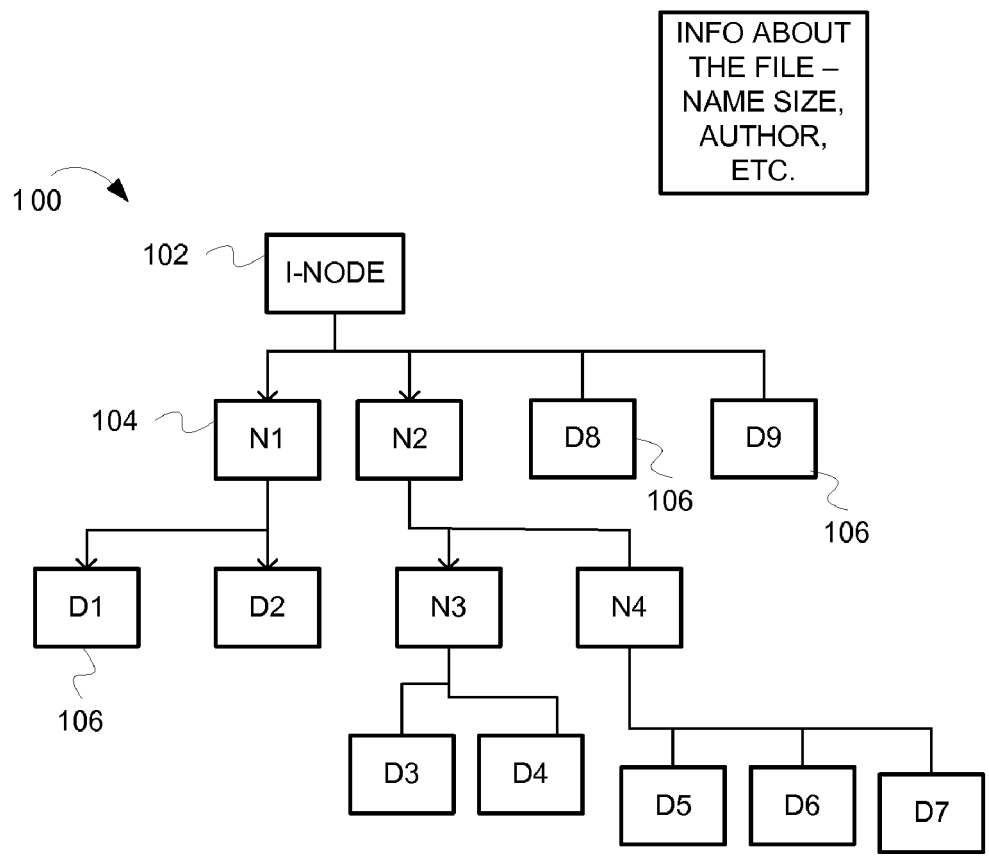
FIG. 1 is a block diagram illustrating inodes, indirect blocks, and data blocks organized as a file.

The description that follows includes exemplary systems, methods, techniques, instruction sequences and computer program products that embody techniques of the present inventive subject matter. However, it is understood that the described embodiments may be practiced without these specific details. For instance, although examples refer to handling file operations in an IBM® Advanced Interactive Executive (AIX®) operating system, in other embodiments, operations described herein can also be implemented in any suitable operating system. In some instances, well-known instructions, protocols, structures, and techniques have not been shown to avoid obfuscating this description.
Introduction
This section provides an introduction to concepts utilized in some embodiments of the inventive subject matter. Some operating systems (e.g., IBM's AIX operating system) store and organize their data in file systems (e.g., JFS2). Operating systems can first store file system data in main memory and then store the data to persistent storage (e.g., on magnetic disk). Data in persistent storage can be referred to as an "original volume."

Some operating systems ensure data redundancy and minimize the impact of system crashes by utilizing certain data consistency methods in their file systems. Data consistency is the concept that data should be valid and accurate. If operating systems maintain consistent file data, they can accurately reconstruct file systems after unexpected faults (e.g., power failure).

One way for operating system file-systems to maintain data consistency is using consistency snapshots. A consistency snapshot (also referred to herein as a "snapshot") is a record of a file system's state at a given moment in time. Although the data required for snapshots is initially in the main memory, it eventually makes it to the persistent storage. 'Creation' of a new snapshot is analogous to writing the last block of that 'consistent view' from the main memory to the persistent storage. Because snapshots are eventually stored in persistent storage (e.g., on magnetic disk), operating system components can use snapshots as a guide for restoring file systems after components fail (e.g., after a loss of power).

Operating systems typically write consistency snapshots to persistent storage on a periodic basis, such as at five second intervals. After a snapshot is written to persistent storage, the file system's "original volume" is the file data present in persistent storage. Under normal operation, file systems's content changes over time. Thus, a file system may change in the time since the consistency snapshot was last written to persistent storage (e.g., because an application writes to a file). The file system can track changes by storing modifications to the original volume in main memory and flushing to the disk during the next snapshot creation. Consequently, new file operations affecting the original volume are recorded in main memory before being written to persistent storage (e.g., upon the next five second interval). For example, if an application program wants to modify an existing file by writing new data to the file, the file system records the new data in the main memory. Later, the file system records the snapshot to persistent storage (e.g., according to a periodic schedule).

As noted, the file system may periodically write a snapshot to persistent storage. The system can write a snapshot to persistent storage in response to various conditions and triggers, such as timers, requests, etc. The process of reconciling the data in main memory and writing it back into the original volume is referred to as "flushing the snapshot" to persistent storage. After this process, the original volume is up-to-date.

Some embodiments of the inventive subject matter allow the file system to continue processing file transactions while writing a snapshot to persistent storage. Thus, embodiments do not block file transactions while flushing snapshots to persistent storage. To avoid blocking, the file system can maintain two snapshot generations. The first snapshot generation is the snapshot being written to persistent storage. The second snapshot generation resides in main memory, and stores data for file transactions occurring after the file system began writing the first snapshot generation. Originally, the data blocks in the second snapshot generation may be duplicates of those from the first snapshot generation, but the second snapshot generation changes as the file system processes file transactions. The discussion below will provide additional details about how embodiments can process file transactions using a plurality of snapshot generations.

Some file systems can organize file data in a tree structure, where files are made-up of inodes, data blocks, and indirect blocks. FIG. 1 is a block diagram illustrating a file. FIG. 1 shows a tree 100. In the tree 100, an inode 102 constitutes the root. The inode 102 can store various information about the file, such as file name, file size, author, access permissions, etc. The inode 102 is connected to a plurality of data blocks 106 and indirect blocks 104. In some instances, the indirect blocks can also be connected with a plurality of (e.g., up to 16) other indirect blocks or a plurality of data blocks (e.g., up to 16). The data blocks can store data (e.g., data written by application programs), while the indirect blocks provide access to (e.g., pointers to) the data blocks or other indirect blocks. The hierarchical structure of the indirect blocks and data blocks forms a file. Although FIG. 1 shows a single file, file systems can include numerous files and directories connected by inodes (e.g., by using a tree structure).

In some embodiments, the file system manages data blocks in main memory and persistent storage using file transactions, which are sets of operations that are linked together as a single, indivisible file operation. Using file transactions ensures that either all of the steps (operations) in a file transaction are completed without error, or none of the steps in the file transaction are completed. In some instances, a file transaction successfully completes a portion of the operations, but later receives an error while attempting to complete other operations. Whenever operations in a transaction return an error, then all of the operations in the file transaction must fail. At this point, the file system will return to its state before the file transaction began, by undoing all individual operations within the transaction. If all of the operations within a file transaction are completed successfully, then the operations are all recorded (i.e., committed) in the file system.

File transactions often create and delete files, directories, and other file system objects. As new files and directories are created and deleted, a file system allocates and de-allocates inodes. For example, if an application program creates a new file, the file system allocates an inode for creating the file. Similarly, if an application program deletes a file, the file system de-allocates an inode (corresponding to that file). File systems can keep track of inodes within an i-map. In some instances, an i-map is a list of all inodes in a file system (or a discrete portion of a file system). In addition to listing all inodes, the i-map indicates whether each inode is free for allocation, or whether it has already been allocated. As a file system consumes inodes, it can generate more inodes by consuming the free space that is available to the file-system (from the persistent storage). For example, if file transactions consume all but a few inodes, the file system can create a new batch of inodes, and add them to the file system. The system can update the i-map to reflect the newly added batch of inodes. The i-map may be implemented as a tree, bitmap, or other suitable data structure. Also, a file-system ultimately stores all the inodes in the persistent storage, and hence the i-map is persistent.

Managing Inodes with Dual Consistency Snapshots

Embodiments of the inventive subject matter allow a file system to process file transactions after detecting a command to write a consistency snapshot to persistent storage. Thus, embodiments maintain two snapshot generations—a first generation snapshot and a second generation snapshot. The first generation snapshot is a consistency snapshot that is being written to the persistent storage. File transactions might still be occurring and writing data into the main memory while data from completed transactions is being written to the disk. Ultimately, for the snapshot to be complete, all the data from all the transactions that have started before the snapshot process began has to be persistent. The snapshot is considered complete when the last data block is written from the main memory to the persistent storage (e.g., magnetic disk). The second generation snapshot is a consistency snapshot that records, in main memory, file transactions occurring while the system is writing the first generation snapshot to persistent storage. As the file-system transactions come in, data might be duplicated in main memory as necessary from the first snapshot version.

As noted above, file systems periodically commit consistency snapshots to persistent storage. Because file transactions are indivisible (see above), file systems may delay commit operations until one or more in-flight transactions are complete. While waiting for the in-flight transactions to complete, other file transactions may arrive and need service. Servicing the file transactions may require allocation and de-allocation of inodes in the i-maps. Embodiments of the inventive subject matter are capable of managing a plurality of i-maps across a plurality of snapshots. The following discussion provides an example of how some embodiments operate.

Figure 2:
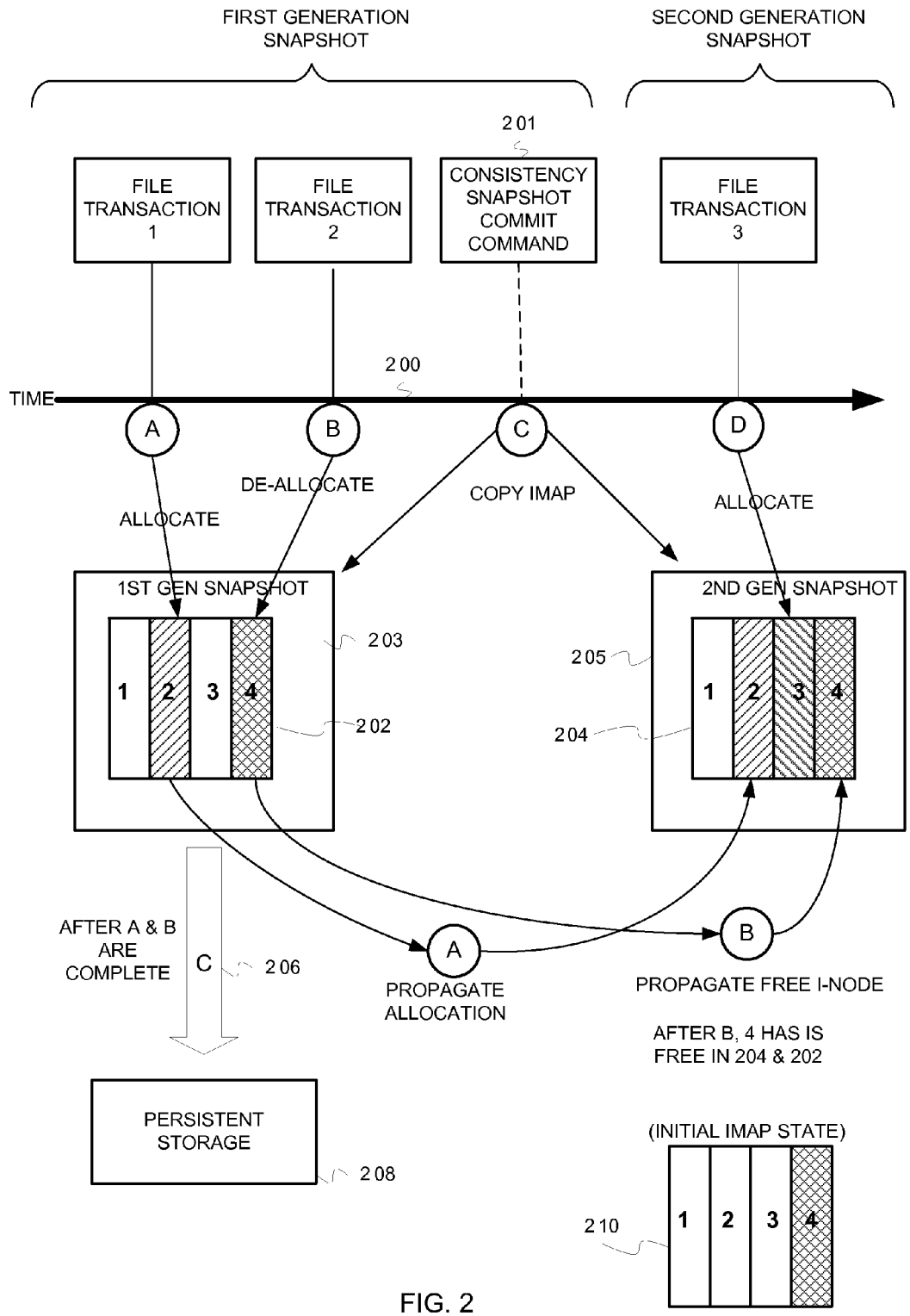
FIG. 2 is a conceptual diagram illustrating operations for managing two i-maps, according to some embodiments.

FIG. 2 is a conceptual diagram illustrating operations for managing two i-maps, according to some embodiments. FIG. 2 shows an i-map 202 in a first generation snapshot 203, and an i-map 204 in a second generation snapshot 205. In FIG. 2, file transactions 1-3 and commit command 201 arrive as time progresses across a timeline 200. Operations A-D show how the file system processes the file transactions and the commit command vis-a-vis the i-maps 202 & 204.

Although not shown, before the file transactions 1 & 2 arrive, the i-map 204 has not yet been created. Also, before transactions 1 & 2 arrive, inodes 1-3 are free in the i-map 202 (they would be shown with no cross hatching), while inode 4 is allocated (shown with cross hatching). An i-map 210 (lower right) shows such an initial state of the i-map 202, although i-map 210 is not part of the operational flow.

In FIG. 2, file transactions 1 & 2 arrive, and a file system begins processing them (see A & B—more details will be given below). However, before transactions 1 & 2 are complete, the file system detects a command 201 to commit the first generation snapshot 203 to persistent storage 208. Because transactions 1 & 2 were in-process before detection of the snapshot commit command 201, the file system associates transactions 1 & 2 with the first generation snapshot 203. Thus, transactions 1 & 2 will affect the first generation snapshot's i-map 202, as described in more detail below.

Upon detecting the commit command 201 and the file transaction 3, the file system creates the second generation snapshot 205 (see C), which includes the i-map 204. In some embodiments, the file system does not generate the second generation snapshot (after the commit command is detected) until after detecting yet another file transaction (e.g., after detection transaction 3). Initially, the newly generated i-map 204 is a copy of the i-map 202 (see i-map 210). All file transactions arriving after detection of the commit command 201 are associated with the second generation snapshot 205, and thus affect the i-map 204. File transaction 3 will affect the second generation snapshot's i-map 204.

Therefore, at this point, file transactions 1, 2, & 3 are in-process, and so is the snapshot commit command 201. The snapshot commit command 201 is waiting for transactions 1 & 2 to complete before it can finish writing a consistent view (the first generation snapshot) to persistent storage 208. Because the file system created the second generation snapshot 205, it can process file transaction 3 in parallel with the operations affecting the first generation snapshot 203. Therefore, the file system need not postpone processing transaction 3 while waiting for transactions 1 & 2 and the commit command 201.

In processing transaction 1, the file system determines it must allocate an inode (see A). To maintain consistency across the i-maps 202 & 204, for transactions associated with the first generation snapshot 203 (i.e., the snapshot currently being committed to persistent storage), the file system must select an inode that is free in both i-maps 202 & 204 and allocate it in both the i-maps (so that i-map 204 does not allocate it for some other transaction). In FIG. 2, the file system selects inode 2 (at this point, inode 2 is free in both i-maps) and marks inode 2 as being allocated (see cross hatching). To maintain consistency across the i-maps 202 & 204, the file system propagates the inode allocation from the first generation snapshot's i-map 202 to the second generation snapshot's i-map 204 (see propagation phase of A).

In processing transaction 2, the file system determines it must de-allocate an inode (see B). To maintain consistency across the i-maps 202 & 204, for transactions associated with the first generation snapshot (i.e., the snapshot currently being committed to persistent storage), the file system must propagate inode de-allocations to the second generation snapshot's i-map 204, thus ensuring that they can be used by some other file-system transactions that arrive in second generation The file system services transaction 2 by marking inode 4 as de-allocated (not shown—if shown, hatching would be removed from inode 4 in i-map 202). The file system propagates the inode de-allocation to the second generation snapshot's i-map 204 (not shown—if shown, hatching would be removed from inode 4 in i-map 204) (see propagation phase of B).

After transactions 1 & 2 complete (and possibly any other transactions, that started before the triggering of consistent snapshot for the first generation, complete), the file system finishes writing the first generation snapshot 203 to persistent storage 208, as per the commit consistency snapshot command 201. However, after the file system detected the commit command 201, it could process file transaction 3 without waiting for completion of the transactions 1 & 2 and commit command 201. As shown (see D), the file system services transaction 3 by allocating an inode (inode 3) in the i-map 204. Because transaction 3 is associated with the second generation snapshot (i.e., the snapshot not currently being committed to persistent storage), the inode need not be free in both i-maps 202 & 204.

More Example Operations

Although FIG. 2 describes how some embodiments manage inodes, this discussion continues a description additional operations for managing inodes.

Figure 3:
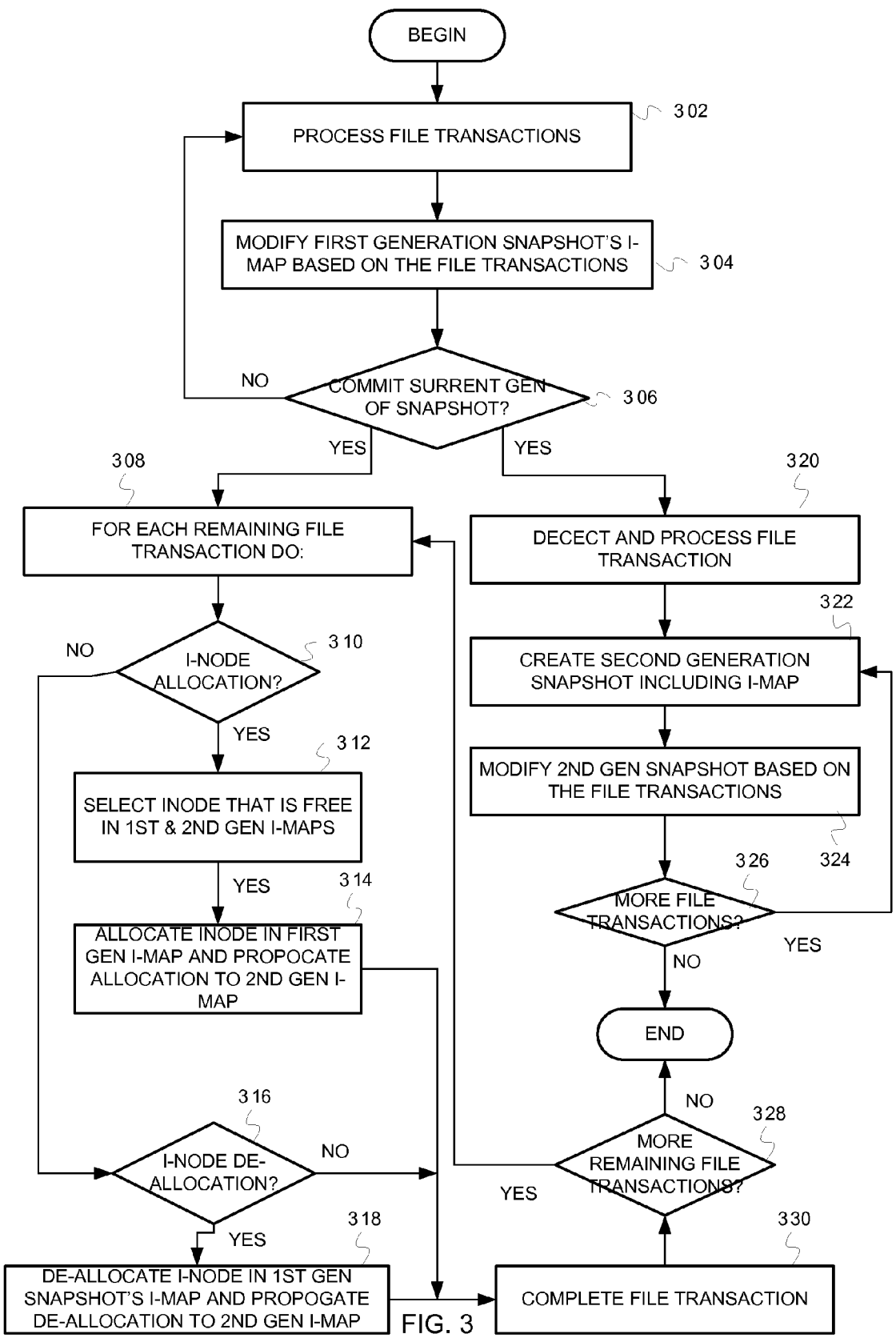
FIG. 3 is a flow diagram illustrating operations for managing inodes, according to some embodiments.

FIG. 3 is a flow diagram illustrating operations for managing inodes, according to some embodiments. In FIG. 3, operational flow begins at block 302. At block 302, a file system processes file transactions. For example, the file system may process file creation and deletion transactions for various application programs. Next (at 304), the file system modifies a first generation snapshot's i-map, based on its processing of the file transactions. For file creation operations, the file system may allocate inodes in a first generation snapshot's i-map. For file deletion operations, it may de-allocate inodes in the i-map. Flow continues at block 306.

At block 306, if the file system detects a command to commit the first generation snapshot to persistent storage, the flow continues in parallel at blocks 320 and 308. However, if such a command is not detected, flow continues at block 302, where the file system continues processing file transactions. After detecting a snapshot commit command (block 306), the file system creates a second generation snapshot after a new transaction arrives (blocks 320 & 322). Initially, the second generation snapshot may be a copy of the first generation snapshot, including an i-map. In servicing such transactions, the file system modifies the second generation snapshot's i-map when allocating and de-allocating inodes. Additionally, the file system may modify data blocks associated with the inodes. After file system has processed all transactions associated with the second generation snapshot, the flow ends (see block 326).

Referring back to block 306, after detecting the commit command (at 306), the file system continues processing file transactions that were received before detection of the commit command, but that have not completed (see path from 306 to 308). In processing such file transactions, the file system performs the following operations. At block 310, the file system determines whether the file operation requires allocation of an inode. If inode allocation is required, the file system selects an inode that is free in the first generation snapshot's i-map and the second generation snapshot's i-map (at block 312). After selecting an inode, (at block 314) the file system marks the first generation snapshot's i-map to reflect the allocation, and propagates the allocation to the second generation snapshot's i-map (thus also marking the second-generation's i-map). Next (at block 330), the file system completes the file transaction. For example, the file system writes data to data blocks associated with the recently allocated inode, updates metadata associated with the file transaction, etc. If there are more transactions that were in-process when the snapshot commit command was detected (block 328), the file system continues processing those file transactions (at block 308). If there are no remaining transactions, this part of the flow ends.

If, at block 310, the file transaction did not require allocation of an inode, the file system determines whether the transaction requires inode de-allocation (block 316). If the transaction requires de-allocation of an inode, the file system marks the inode as de-allocated in the first generation snapshot's i-map, and propagates the de-allocation to the i-map of the second generation snapshot (block 318). After de-allocating the inode, the file system performs the operations at blocks 330 and 328, as described above.

Example Components

Figure 4:
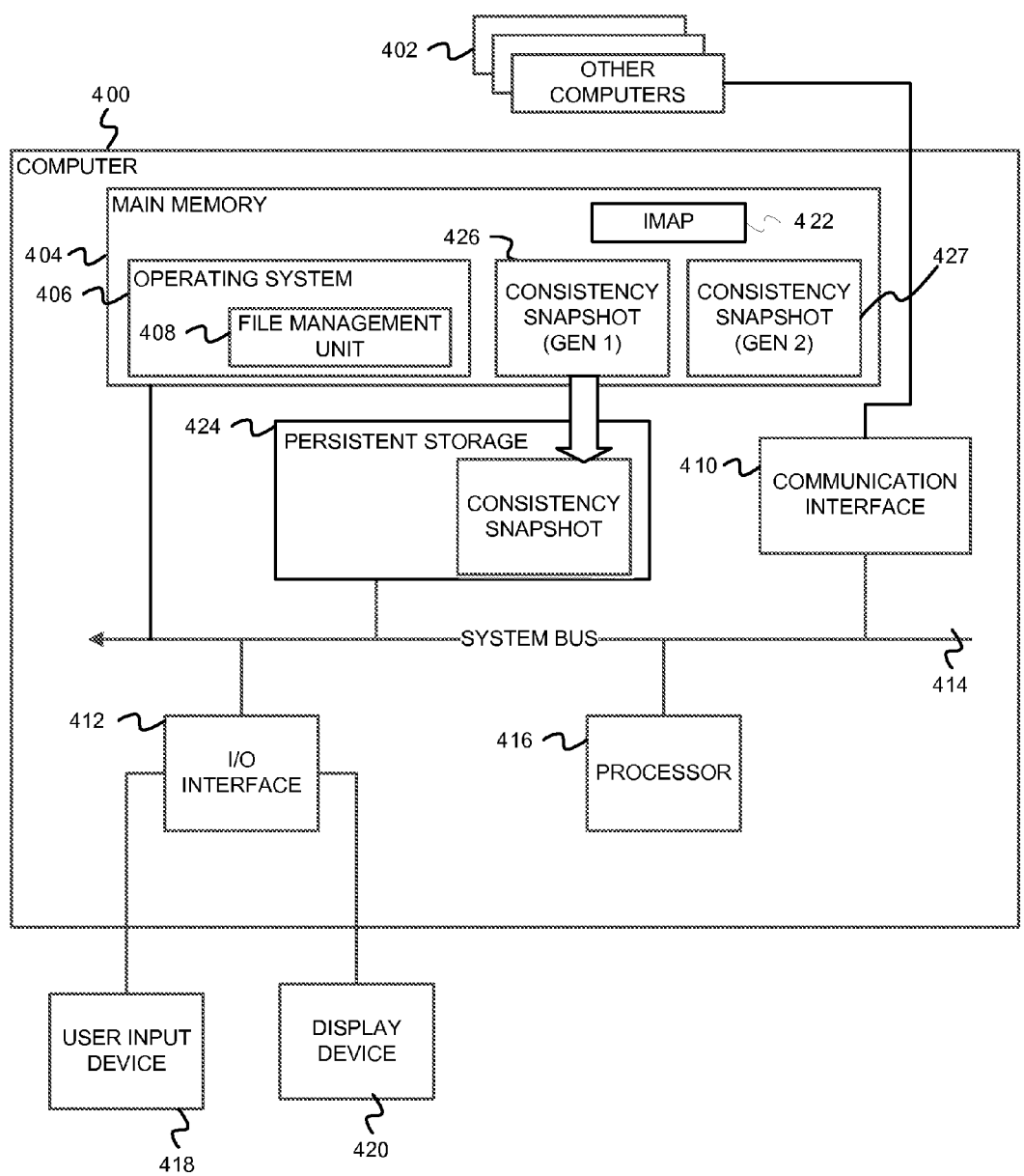
FIG. 4 depicts an example computer system capable of managing a plurality of i-maps.

FIG. 4 depicts an example computer system capable of managing a plurality of i-maps. A computer system 400 includes a processor 416 (possibly including multiple processors, multiple cores, multiple nodes, and/or implementing multi-threading, etc.). The computer system 400 includes main memory 404. The main memory 404 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible implementations of machine-readable storage media. The computer system also includes a system bus 414 (e.g., PCI, ISA, PCI-Express, HyperTransport®, InfiniBand®, NuBus, etc.), a communication interface 410 (e.g., an ATM interface, an Ethernet interface, a Frame Relay interface, SONET interface, wireless interface, etc.), and an I/O (input/output) interface 412. The communication interface allows the computer system 400 to communicate (e.g., send and receive data) with other computers 402. Input/output interface adapters in computers can implement user-oriented input/output through, for example, software drivers and computer hardware. The I/O interface 412 may utilize various display devices 420, such as computer display screens, and various user input devices 418, such as keyboards and mice.

The main memory 404 includes components to implement embodiments described above, such as components for managing a plurality of i-maps in a plurality of snapshot generations. As shown, the main memory 404 includes consistency snapshots 426 and 427, which include i-maps 422 and 423. The memory unit 404 also includes an operating system 406 (portions of the operating system 406 may located in persistent storage 424). In some embodiments, the operating system includes a file management unit 408. In some embodiments, the file management unit 408 can perform the operations described above. In some embodiments, the file management unit 408 performs operations is entirely or partially a hardware unit. In other embodiments, the file management unit 408 performs operations by executing instructions on the processor 416. For example, embodiments may be implemented with an application specific integrated circuit, in logic implemented in the processor 416, in a co-processor on a peripheral device or card, etc. Further, realizations may include fewer or additional components not illustrated in FIG. 4 (e.g., video cards, audio cards, additional network interfaces, peripheral devices, etc.). The processor 416, the I/O interface 412, and the communication interface 410 are coupled to the system bus 414. Although illustrated as being coupled to the system bus 414, the memory unit 404 may be coupled to the processor 416.

While the embodiments are described with reference to various implementations and exploitations, it will be understood that these embodiments are illustrative and that the scope of the inventive subject matter is not limited to them. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The invention claimed is:

1. A method for maintaining, in a computer system, data consistency of file system using a first consistency snapshot and a second consistency snapshot, the method comprising:
   detecting a first group of file transactions;
   modifying a first i-map in the first consistency snapshot, the modifying the first i-map based on a first sub-group of file transactions of the first group;
   commencing operations for recording the first consistency snapshot to a persistent storage;
   for a second sub-group of file transactions of the first group that appear after the commencing operations for recording the first consistency snapshot, performing the following,
      generating the second consistency snapshot including a second i-map, where the second i-map includes content from the first i-map;
      detecting that the second sub-group of file transactions allocates inodes represented in the first i-map;
      determining the inodes are free in the second i-map;
      allocating the inodes in the first and second i-maps;
   detecting, after the generating the second consistency snapshot, a second group of file transactions; and
   modifying, while the operations for recording the first consistency snapshot are occurring, the second i-map of the second consistency snapshot based on the second group of file transactions.

2. The method of claim 1 further comprising:
   for a third sub-group of transactions of the first group, performing the following,
      detecting that the third sub-group of file transactions free additional inodes in the first i-map; and
      freeing the additional inodes in the first and second i-maps.

3. The method of claim 1 wherein the i-map is represented as a bitmap.

4. The method of claim 1 wherein the first group of file transactions are received before commencing operations for recording the first consistency snapshot to the persistent storage.

5. The method of claim 1, wherein the first and second i-maps indentify inodes that have been allocated in the file system.

6. The method of claim 1, wherein the first and second i-maps indentify inodes have not been allocated for use.

7. An apparatus comprising:
   a processor;
   a memory unit coupled with the processor, wherein the memory unit includes a file management unit configured to maintain data consistency of a file system using a first consistency snapshot and a second consistency snapshot, the file management unit configured to:
   detect a first group of file transactions;
   modify a first i-map in the first consistency snapshot, the modifying the first i-map based on a first sub-group of file transactions of the first group;
   commence operations that record the first consistency snapshot to a persistent storage;
   for a second sub-group of file transactions of the first group that appear after commencement of operations that record the first consistency snapshot, perform the following,
      generate the second consistency snapshot including a second i-map, where the second i-map includes content of the first i-map;
      detect that the second sub-group of file transactions allocates inodes represented in the first i-map;
      determine the inodes are free in the second i-map;
      allocate the inodes in the first and second i-maps;
   detect, after the generation of the second consistency snapshot, a second group of file transactions; and
   modify, while the operations for recording the first consistency snapshot are occurring, the second i-map of the second consistency snapshot based on the second group of file transactions.

8. The apparatus of claim 7, wherein the file management unit is further configured to:
   for a third sub-group of transactions of the first group, perform the following,
      detect that the third sub-group of file transactions free additional inodes in the first i-map; and
      free the additional inodes in the first and second i-maps.

9. The method of claim 7 wherein the i-map is represented as a bitmap.

10. The apparatus of claim 7 wherein the first group of file transactions are received before commencing operations for recording the first consistency snapshot to the persistent storage.

11. The apparatus of claim 7, wherein the first and second i-maps indentify inodes that have been allocated in the file system.

12. The apparatus of claim 7, wherein the first and second i-maps indentify inodes have not been allocated for use.

13. A computer program product for maintaining, in a computer system, data consistency of file system using a first consistency snapshot and a second consistency snapshot, the computer program product comprising:
   a computer readable storage medium having computer usable program code embodied therewith, the computer readable program code configured to,
   detect a first group of file transactions;
   modify a first i-map in the first consistency snapshot, the modification to the first i-map based on a first sub-group of file transactions of the first group;
   commence operations to record the first consistency snapshot to a persistent storage;
   for a second sub-group of file transactions of the first group that appear after the commencement of operations to record the first consistency snapshot, perform the following,
      generate the second consistency snapshot including a second i-map, where the second consistency snapshot is a copy of the first consistency snapshot;
      detect that the second sub-group of file transactions allocates inodes represented in the first i-map;
      determine the inodes are free in the second i-map;
      allocate the inodes in the first and second i-maps;
   detect, after the generation of the second consistency snapshot, a second group of file transactions; and
   modify, while the operations to record the first consistency snapshot occur, the second i-map of the second consistency snapshot based on the second group of file transactions.

14. The computer program product of claim 13, wherein the computer usable program code is further configured to:
   for a third sub-group of transactions of the first group, perform the following,
      detect that the third sub-group of file transactions free additional inodes in the first i-map; and free the additional inodes in the first and second i-maps.

15. The computer program product of claim 13 wherein the i-map is represented as a bitmap.

16. The computer program product of claim 13 wherein the first group of file transactions are received before commencement of operations to record the first consistency snapshot to the persistent storage.

17. The computer program product of claim 13, wherein the first and second i-maps indentify inodes that have been allocated in the file system.

18. The computer program product of claim 13, wherein the first and second i-maps indentify inodes have not been allocated for use.

* * * * *